United States Patent
Xu et al.

(10) Patent No.: US 9,413,524 B1
(45) Date of Patent: Aug. 9, 2016

(54) DYNAMIC GAIN CLOCK DATA RECOVERY IN A RECEIVER

(71) Applicant: Xilinx, Inc., San Jose, CA (US)

(72) Inventors: Yu Xu, Palo Alto, CA (US); Yohan Frans, Palo Alto, CA (US); Kun-Yung Chang, Los Altos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/887,744

(22) Filed: Oct. 20, 2015

(51) Int. Cl.
*H04L 7/00* (2006.01)
*H04L 27/06* (2006.01)
*H03L 7/085* (2006.01)
*H04B 1/16* (2006.01)

(52) U.S. Cl.
CPC .............. *H04L 7/0087* (2013.01); *H03L 7/085* (2013.01); *H04B 1/16* (2013.01)

(58) Field of Classification Search
CPC . H04L 7/0025; H04L 7/033; H04L 25/03057; H04L 7/02; H04L 7/002; H04L 7/0079; H04L 7/0337; H04L 7/0087; H04L 7/085; H04L 1/16; H03L 7/095; H03L 7/0807; H03L 7/087; H03L 7/091; H04J 3/0685
USPC .......... 375/354, 355, 359, 360, 371, 316, 340
See application file for complete search history.

(56) References Cited

U.S. PATENT DOCUMENTS

| | | | | |
|---|---|---|---|---|
| 6,584,163 B1 * | 6/2003 | Myers, Jr. | ............. | H04L 7/0338 375/355 |
| 6,639,437 B2 * | 10/2003 | Natsume | ............... | H04L 7/0338 327/141 |
| 9,209,960 B1 * | 12/2015 | Leung | ..................... | H04L 7/002 |
| 2003/0142773 A1 * | 7/2003 | Shirota | .................. | H03L 7/0814 375/373 |
| 2004/0052322 A1 * | 3/2004 | Robertson | ............... | H04L 25/14 375/371 |
| 2008/0310570 A1 * | 12/2008 | Tomita | ...................... | G06F 1/12 375/357 |
| 2011/0170644 A1 * | 7/2011 | Iqbal | ..................... | H04L 7/0337 375/355 |
| 2011/0216863 A1 * | 9/2011 | Tomita | ..................... | H04L 7/00 375/371 |
| 2014/0139266 A1 * | 5/2014 | Kenney | ................ | G01R 25/005 327/9 |
| 2014/0192935 A1 * | 7/2014 | Palusa | ..................... | H04L 7/033 375/340 |
| 2014/0270030 A1 * | 9/2014 | Hammad | .............. | H04L 7/0079 375/371 |
| 2015/0010047 A1 * | 1/2015 | Zhong | ............... | H04L 25/03057 375/233 |

* cited by examiner

*Primary Examiner* — Tesfaldet Bocure

(74) *Attorney, Agent, or Firm* — Keith Taboada; Robert M. Brush

(57) ABSTRACT

In an example, an apparatus for CDR includes at least one data register, at least one edge register having an input coupled to an output of the at least one data register, and a phase detector having inputs coupled to the output of the at least one data register and an output of the at least one edge register. The apparatus further includes a frequency accumulator coupled to an output of the phase detector, a dynamic gain circuit coupled to the output of the phase detector, and a phase accumulator and code generator circuit configured to generate codes to control a phase interpolator based on an output of the dynamic gain circuit and an output of the frequency accumulator.

18 Claims, 4 Drawing Sheets

DYNAMIC GAIN CLOCK DATA RECOVERY IN A RECEIVER

TECHNICAL FIELD

Examples of the present disclosure generally relate to electronic circuits and, in particular, to dynamic gain clock data recovery (CDR) in a receiver.

BACKGROUND

Clock data recovery (CDR) is an important block in a receiver system for high-speed serial communications. The CDR block generates the correct sampling dock phase for data recovery. The quality of the high-speed serial communication link can be sensitive to the sampling dock phase, especially in the presence of jitter and noise.

In a receiver having a phase interpolator that determines a clock phase for sampling the incoming data, the CDR is used to identify if the currently used dock phase is the best to capture the incoming data. The CDR provides dynamic phase adjustments for the phase interpolator. The CDR operates to move the dock phase location towards the center of the data eye. The farther the current dock phase is from the center of the data eye the longer it takes for the CDR to lock to the correct dock phase. Long locking times can lead to data loss.

SUMMARY

Techniques for providing dynamic gain clock data recovery (CDR) in a receiver are described. In an example, an apparatus for CDR includes at least one data register, at least one edge register having an input coupled to an output of the at least one data register, and a phase detector having inputs coupled to the output of the at least one data register and an output of the at least one edge register. The apparatus further includes a frequency accumulator coupled to an output of the phase detector, a dynamic gain circuit coupled to the output of the phase detector, and a phase accumulator and code generator circuit configured to generate codes to control a phase interpolator based on an output of the dynamic gain circuit and an output of the frequency accumulator.

In another example, a receiver includes a front end operable to receive from a transmitted signal from a channel, a decision circuit, coupled to an output of the front end, operable to generate data samples according to a sampling clock, and a phase interpolator operable to provide the sampling clock. The receiver further includes a clock data recovery (CDR) circuit operable to control the phase interpolator to adjust phase of the sampling clock, the CDR operable to generate a net phase adjustment in response to the data samples and to apply a dynamic gain to the net phase adjustment to control the phase interpolator.

In another example, a method of clock data recovery (CDR) for a receiver, comprising: generating data samples derived from a received signal using a decision circuit; generating a sampling clock for the decision circuit using a phase interpolator; and adjusting a phase of the sampling clock by applying a dynamic gain to a net phase adjustment determined by a CDR circuit.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
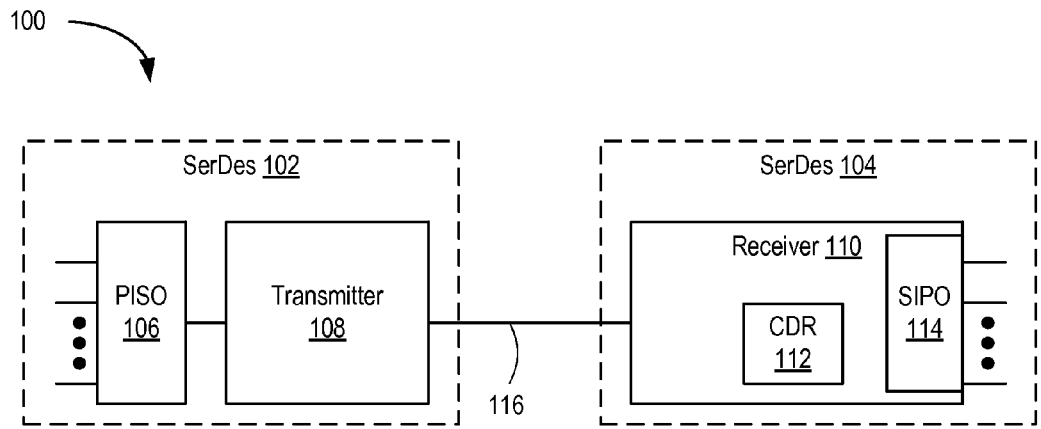
FIG. 1 is a block diagram depicting an example communication system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Techniques for providing dynamic gain clock data recovery (CDR) in a receiver are described. In an example, a CDR circuit includes data register(s), edge register(s), a phase detector, a frequency accumulator, a dynamic gate circuit, and a phase accumulator and code generator circuit. The edge register(s) have an input coupled to an output of the at least one data register. The phase detector has inputs coupled to the output of the at least one data register and an output of the at least one edge register. The frequency accumulator is coupled to an output of the phase detector. The dynamic gain circuit is coupled to the output of the phase detector. The phase accumulator and code generator circuit is configured generate codes to control a phase interpolator based on an output of the dynamic gain circuit and an output of the frequency accumulator.

As described further below, the phase detector tends to produce a correct net phase adjustment for the CDR when the capturing phase is away from its locking position (optimal location). This implies that the value of the net phase adjustment is larger when the sampling clock phase is farther from its locking position, and smaller when the sampling clock phase is nearer to its locking position. If no gain were applied, smaller incremental phase adjustments would be applied, which would increase the locking time of the CDR. Applying a gain to the net phase adjustment produces a larger incremental phase adjustment, which can decrease locking time of the CDR. However, applying a static gain to the net phase adjustment at all times can result in over-shooting the locking position, which increases locking time of the CDR. Accordingly, the dynamic gain circuit can dynamically apply gain to the net phase adjustment depending on magnitude of the net phase adjustment. The dynamic gain circuit can apply a larger gain to larger values of the net phase adjustment (e.g., when the sampling clock phase is farther from its locking position), and can apply smaller gain to smaller values of the net phase adjustment (e.g., when the sampling clock phase is nearer its locking position). As such, the dynamic gain circuit improves locking time without causing over-shooting. These and further aspects are described below with reference to the following figures.

FIG. 1 is a block diagram depicting an example communication system 100. The communication system 100 comprises a transmitter 108 coupled to a receiver 110 via a channel 116. In an example, the transmitter 108 is a part of a serializer/deserializer (SerDes) 102, and the receiver 110 is part of a SerDes 104. For clarity, the deserialization circuitry is omitted from the SerDes 102, and the serialization circuitry is omitted from the SerDes 104. The SerDes 102 includes a parallel-in-serial-out (PISO) circuit 106 that converts parallel input data to serial output data for transmission over the channel 116 by the transmitter 108. The SerDes 104 includes a serial-in-parallel-out (SIPO) circuit that converts serial data input to the receiver 110 to parallel output data. The SerDes 102 and the SerDes 104 can include other circuitry (not shown), such as decoders, encoders, and the like.

While the SerDes 102 and the SerDes 104 are shown, in other examples, each of the transmitter 108 and/or the receiver 110 can be a stand-alone circuit not being part of a larger transceiver circuit. In some examples, the transmitter and the receiver 110 can be part of one or more integrated circuits (ICs), such as application specific integrated circuits (ASICs) or programmable ICs, such as field programmable gate arrays (FPGAs).

The channel 116 can include an electrical or optical transmission medium. An electrical transmission medium can be any type of electrical path between the transmitter 108 and the receiver 110, which can include metal traces, vias, cables, connectors, decoupling capacitors, termination resistors, and the like. The electrical transmission medium can be a differential signal path. An optical transmission medium can be any type of optical path between the transmitter 108 and the receiver 110, which can include any kind of optical modules.

In an example, the transmitter 108 transmits serialized data over the channel 116 using a digital baseband modulation, such as a binary non-return-to-zero (NRZ) modulation, multilevel pulse amplitude modulation (PAM-n), or the like. In NRZ modulation, each transmitted symbol comprises one bit. In multilevel PAM, each symbol comprises multiple bits. For example 4-level PAM (PAM4) includes four levels and can be used to transmit two-bit symbols. In general, the transmitter 108 transmits the serialized data as a sequence of symbols using a particular modulation scheme. There are two possible values for each symbol in NRZ modulation, and there are n possible values for each symbol in PAM-n modulation. The rate at which the transmitter 108 transmits the symbols is referred to as the symbol-rate or baud-rate.

The transmitter 108 does not transmit a reference clock with the data. Rather, the receiver 110 includes a clock data recovery (CDR) circuit 112 (or CDR 112) for extracting a clock from the incoming symbol stream. The extracted clock is sequentially used to sample the incoming symbol stream and recover the transmitted bits. As described herein, the CDR 112 operates using a dynamic gain to reduce locking time and improved performance.

Figure 2:
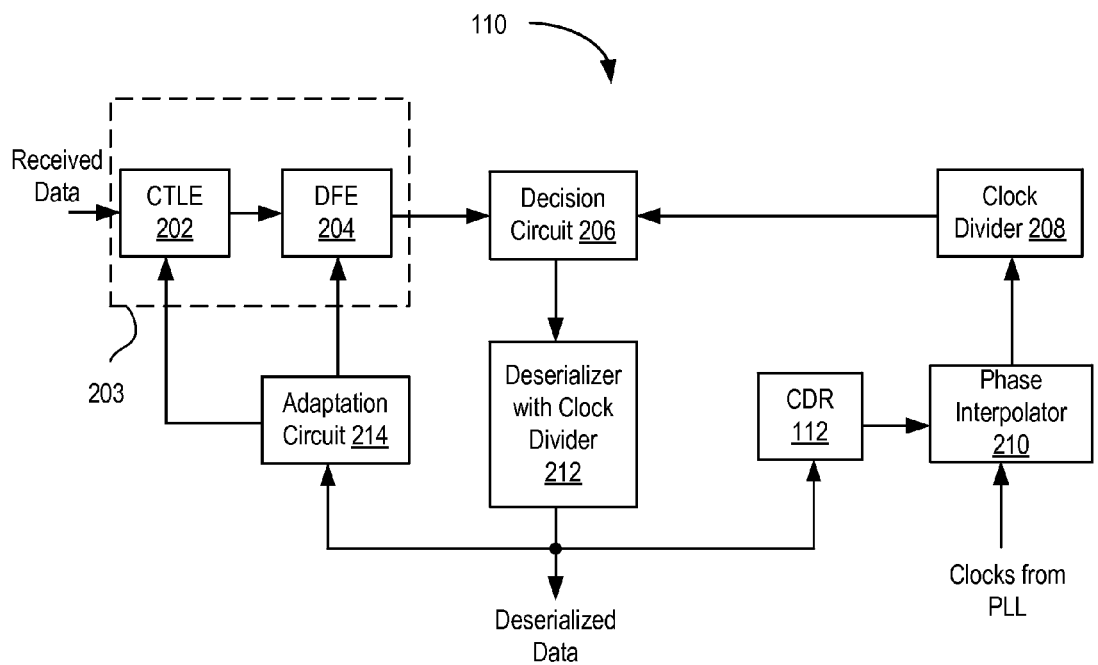
FIG. 2 is a block diagram depicting an example of receiver.

FIG. 2 is a block diagram depicting an example of the receiver 110. The receiver 110 includes a continuous time linear equalizer (CTLE) 202, a decision feedback equalizer (DFE) 204, a decision circuit 206, a clock divider 208, a phase interpolator 210, a deserializer 212, an adaptation circuit 214, and the CDR 112. The CTLE 202 and DFE 204 can be part of a front end 203 of the receiver 110.

The CTLE 202 is coupled to receive an analog input signal from the channel 116 ("received data"). The channel 116 degrades the signal quality of the transmitted analog signal. Channel insertion loss is the frequency-dependent degradation in signal power of the analog signal. When signals travel through a transmission line, the high frequency components of the analog signal are attenuated more than the low frequency components. In general, channel insertion loss increases as frequency increases. Signal pulse energy in the analog signal can be spread from one symbol period to another during propagation on the channel 116. The resulting distortion is known as inter-symbol interference (ISI). In general, ISI becomes worse as the speed of the communication system increases.

The CTLE 202 operates as a high-pass filter or band-pass filter to compensate for the low-pass characteristics of the channel 116. The peak of the frequency response of the CTLE 202 can be adjusted by the adaptation circuit 214. The CTLE 202 can also provide for automatic gain control (AGC) to control the gain of the high-pass filter. The CTLE 202 outputs an equalized analog signal to the DFE 204. While the CTLE 202 is shown, in other examples, the receiver 110 can include other types of continuous-time filters with or without amplification. Thus, in general, the receiver 110 filters the analog signal received from the channel 116 to generate a "filtered analog signal" using some type of continuous-time filter with or without amplification, such as the CTLE 202 shown in FIG. 2.

The DFE 204 is coupled to the CTLE 202 and receives the filtered analog signal. The DFE 204 is operable to equalize the filtered analog signal to compensate for post-cursor ISI. The DFE 204 can include one or more analog filters as known in the art. The DFE 204 can receive a control signal from the adaptation circuit 214. The DFE 204 generates an "equalized analog signal."

The decision circuit 206 samples the equalized analog signal to generate a data sample per symbol. The decision circuit 206 can include a slicer or like circuit to sample the equalized analog signal using a sampling clock output from the clock divider 208. The decision circuit 206 outputs a stream of data samples based on the sampling clock. As described below, the CDR 112 adjusts the phase of the sampling clock so that the data samples correspond to the center of the data eye.

The deserializer 212 receives the data samples from the decision circuit 206. The deserializer 212 also receives the sampling clock either forwarded from the decision circuit 206 or directly from the clock divider 208. In some examples, the deserializer 212 can include a clock divider to derive a deserialization clock from the sampling clock. The deserializer 212 generates parallel output data ("deserialized data") from the data samples using the deserialization clock. The deserializer 212 also provides the deserialized data to the adaptation circuit 214 and the CDR 112.

The adaptation circuit 214 generates control signals for the CTLE 202 and the DFE 204 based on the deserialized data using any well-known equalization algorithm. The CDR 112 generates a control signal for the phase interpolator 210 based on the deserialized data, as described below.

The phase interpolator 210 receives one or more clocks from a clock generator, such as a phase locked loop (PLL). The phase interpolator 210 adjusts the phase of the clock(s) based on the control signal output from the CDR 112. The phase interpolator 210 outputs the phase adjusted clock(s) to the clock divider 208. The clock divider 208 can divide the phase adjusted clock(s) by any selected integer or fractional amount to generate at least the sampling clock. Other clock(s) output from the phase interpolator 210 and the clock divider 208 can include clocks having a fixed phase shift from the sampling clock (e.g., clocks shifted by 90, 180, and/or 270 degrees from the sampling clock).

Figure 3:
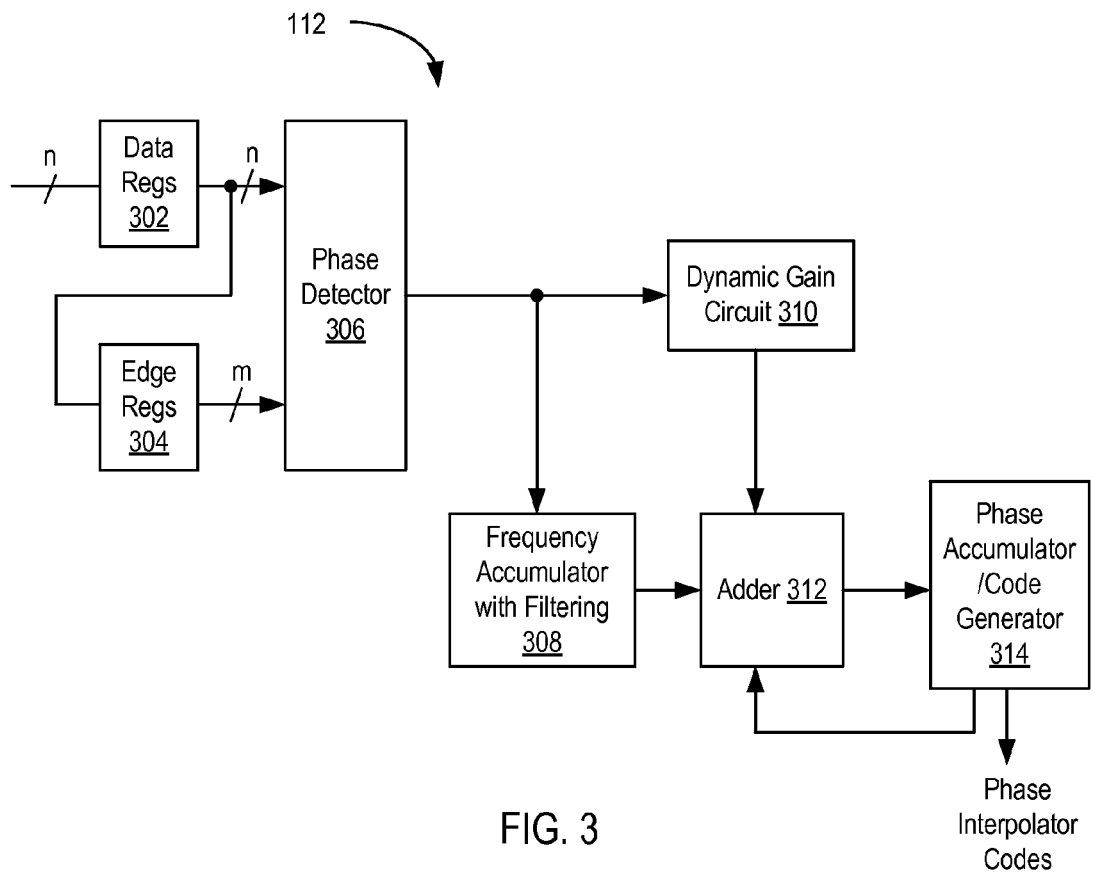
FIG. 3 is a block diagram depicting an example of a clock data recovery (CDR) circuit.

FIG. 3 is a block diagram depicting an example of the CDR 112. The CDR 112 includes data registers 302, edge registers 304, a phase detector circuit 306, a dynamic gain circuit 310, a frequency accumulator with filtering 308 (generally referred to as "frequency accumulator 308"), an adder 312, and a phase accumulator/code generator 314. Inputs of the data registers 302 are coupled to outputs of the deserializer 212. In the example, the deserializer 212 provides an n-bit output bus. The data registers 302 can comprise n registers, one for each signal of the n-bit output bus of the deserializer 212. Outputs of the data registers 302 are coupled to the phase detector circuit 306.

Inputs of the edge registers 304 are coupled to the outputs of the data registers 302. The edge registers 304 can include m registers to store the contents of the data registers 302 for later use. Outputs of the edge registers 304 are coupled to the phase detector circuit 306. The data registers 302 and the edge registers 304 capture data according to a clock (not shown in FIG. 3), such as the sampling clock output by the clock divider 208. Outputs of the data registers 302 are 180 degrees out of phase with respect to outputs of the edge registers 304. Outputs of the data registers 302 are referred to as "data samples," and outputs of the edge registers 304 are referred to as "edge samples."

The phase detector circuit 306 is configured to determine a net phase adjustment based on the data and edge samples received from the data registers 302 and the edge registers 304. The phase detector circuit 306 can determine n phase adjustments for each of the n pairs of the data and edge registers. The phase detector circuit 306 can arithmetically combine the n phase adjustments to generate the net phase adjustment (e.g., summing, averaging, and the like). The phase detector circuit 306 outputs net phase adjustment values to the dynamic gain circuit 310 and the frequency accumulator 308.

The dynamic gain circuit 310 applies a gain to each net phase adjustment value. As described below, the dynamic gain circuit 310 can dynamically adjust the applied gain. The dynamic gain circuit 310 outputs an incremental phase adjustment.

The frequency accumulator 308 receives the net phase adjustment values from the phase detector. The frequency accumulator 308 accumulates the net phase adjustment values. In contrast with the phase accumulator/code generator 314, the frequency accumulator 308 is bounded symmetrically. The accumulated output of the frequency accumulator 308 can be filtered and then provided to the adder 312. As compared to the phase path, the frequency path is a second-order loop. The frequency accumulator 308 compensates for finite frequency differences between the transmitter clock and the receiver clock.

The phase accumulator/code generator 314 accumulates the net phase adjustment values as the phase detector circuit 306 generates each net phase adjustment value. The phase accumulator/code generator 314 outputs an accumulated phase adjustment to the adder 312.

The adder 312 computes a sum of the accumulated phase adjustment values and the incremental phase adjustment values. The adder 312 outputs a final phase adjustment, which is coupled to the phase accumulator/code generator 314. The phase accumulator/code generator 314 generates codes to control the phase interpolator 210 based on the final phase adjustment values output from the adder 312 ("phase interpolator codes").

As shown in FIG. 2, the CDR 112 is part of a closed-loop circuit in the receiver 110. Since the data is transmitted from an independent source (e.g., the transmitter 108), there is a need to align the sampling clock phase to the optimal location within the data eye to capture the incoming data. This is achieved through phase adjustment determined by the CDR 112. The locking time of the CDR 112 is defined to be the time required for the phase of the sampling clock to move to the optimal location of the data eye. The maximum locking time for the sampling clock phase is half of the data eye. The CDR 112 applied dynamic gain to the phase adjustment in order to reduce locking time.

Referring to FIG. 3, the phase detector circuit 306 tends to produce a correct net phase adjustment when the capturing phase is away from its locking position (optimal location). This implies that the value of the net phase adjustment is larger when the sampling clock phase is farther from its locking position, and smaller when the sampling clock phase is nearer to its locking position. If no gain were applied, smaller incremental phase adjustments would be applied by the adder 312 to the accumulated phase adjustment, which would increase the locking time of the CDR 112. Applying a gain to the net phase adjustment produces a larger incremental phase adjustment, which can decrease locking time of the CDR 112. However, applying a static gain to the net phase adjustment at all times can result in over-shooting the locking position, which increases locking time of the CDR 112. Accordingly, the dynamic gain circuit 310 can dynamically apply gain to the net phase adjustment depending on magnitude of the net phase adjustment. The dynamic gain circuit 310 can apply a larger gain to larger values of the net phase adjustment (e.g., when the sampling clock phase is farther from its locking position), and can apply smaller gain to smaller values of the net phase adjustment (e.g., when the sampling clock phase is nearer its locking position). As such, the dynamic gain circuit 310 improves locking time without causing over-shooting.

Figure 4:
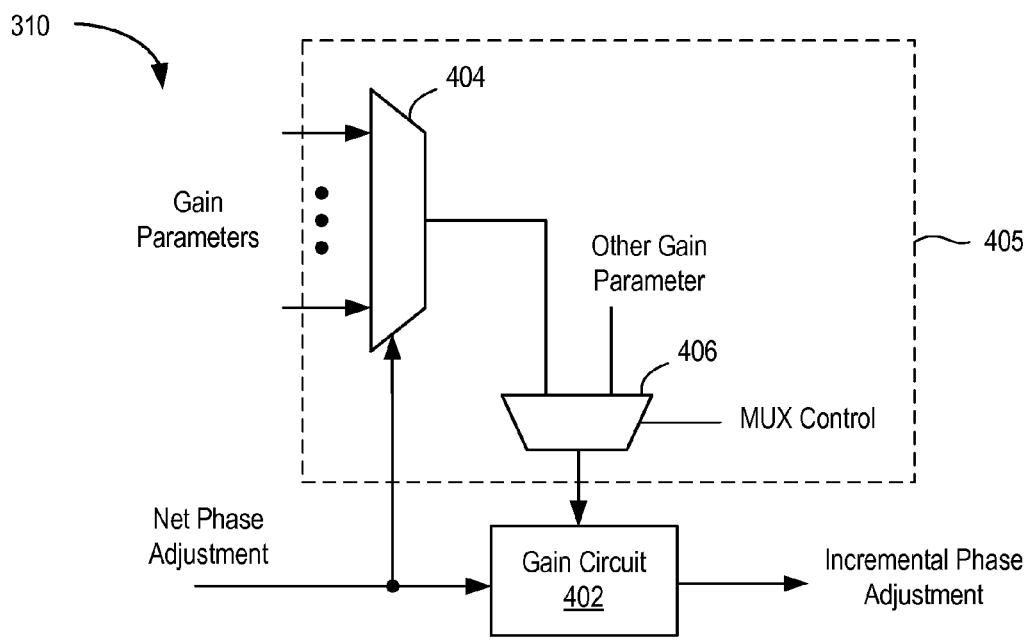
FIG. 4 is a block diagram depicting an example of a dynamic gain circuit in a CDR circuit.

FIG. 4 is a block diagram depicting an example of the dynamic gain circuit 310. The dynamic gain circuit 310 includes a gain circuit 402 and multiplexing logic 405. In the example, the multiplexing logic 405 comprises a multiplexer 404 and a multiplexer 406. Inputs to the multiplexer 404 comprise various gain parameters. Some gain parameters resulting in application of larger gain, while other gain parameters result in application of smaller gain. The gain parameters can be distributed to provide various values of gain from large to small. The multiplexer 404 can include any number of inputs and, as such, there can be any number of gain parameters. A control terminal of the multiplexer 404 can be coupled to receive the net phase adjustment from the phase detector circuit 306. Larger values of the net phase adjustment can select larger gain parameters, and smaller values of the net phase adjustment can select smaller gain parameters.

The gain parameter selected by the multiplexer 404 is coupled to an input of the multiplexer 406. The multiplexer 406 can include one or more other inputs for provide other gain parameters. For example, the multiplexer 406 can include an input to receive a custom gain parameter from another source (e.g., a user-defined gain parameter). The multiplexer 406 can receive a control signal at its control terminal for selecting among the output of the multiplexer 404 and the one or more other gain parameters. The multiplexer 406 outputs a selected gain parameter to the gain circuit 402.

The gain circuit 402 is configured to receive the net phase adjustment output by the phase detector circuit 306. The gain circuit 402 applies a gain to the net phase adjustment based on the gain parameter output by the multiplexer 406. The gain circuit 402 can multiply the net phase adjustment by the gain parameter, perform binary shifting, or the like to generate the incremental phase adjustment. The gain circuit 402 outputs the incremental phase adjustment to the adder 312, which operates as described above.

The dynamic gain circuit 310 is implemented without creating a critical path in the CDR 112. As such, the dynamic gain circuit 310 does not increase the latency of the CDR 112.

Figure 5:
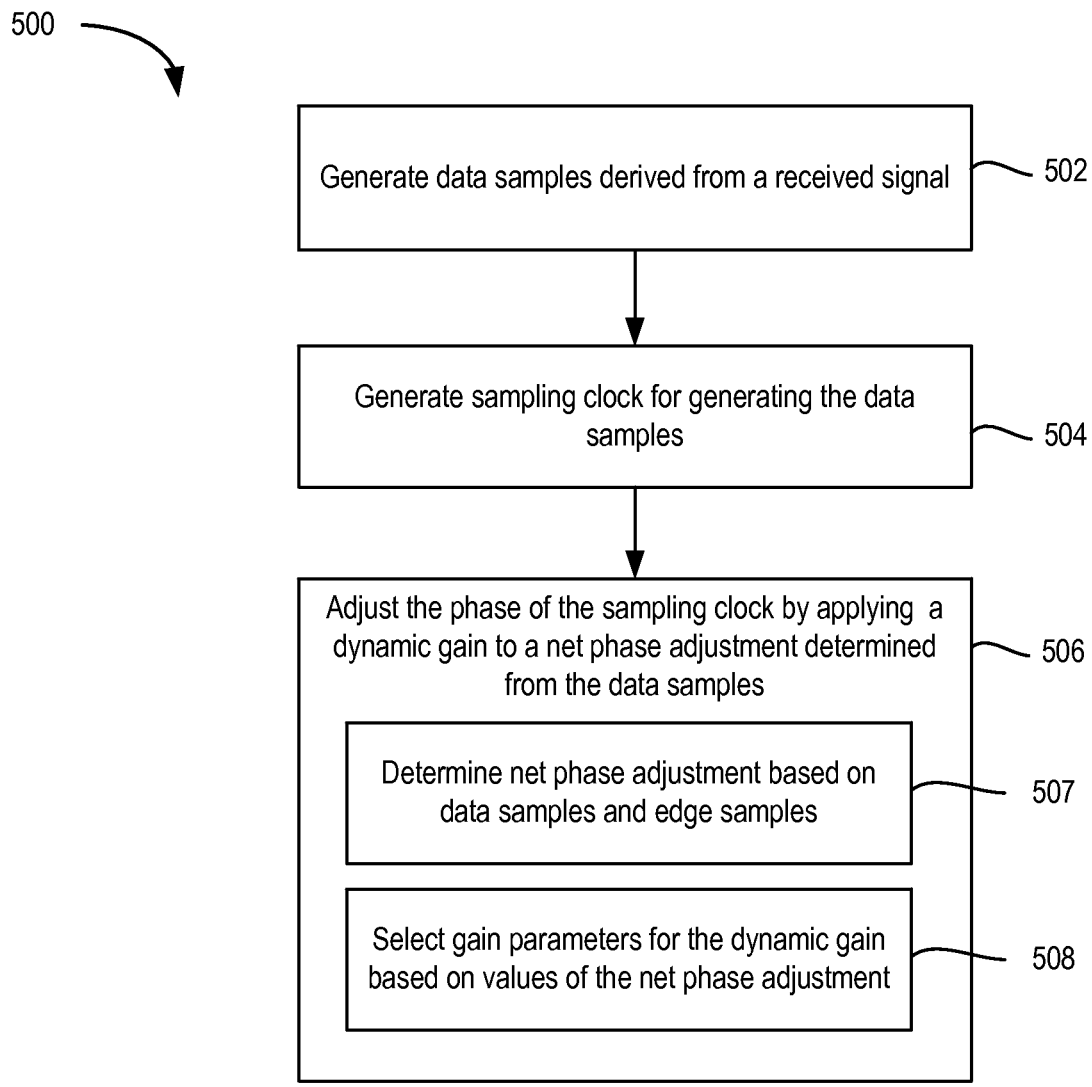
FIG. 5 is a flow diagram depicting an example of a method of clock data recovery (CDR) for a receiver.

FIG. 5 is a flow diagram depicting an example of a method 500 of clock data recovery (CDR) for a receiver. The method 500 begins at block 502, where the decision circuit 206 generates data samples derived from a received signal. At block 504, the phase interpolator 210 and the clock divider 208 generate a sampling clock used by the decision circuit 206 to generate the data samples. At block 506, the CDR 112 adjusts the phase of the sampling clock by applying a dynamic gain to a net phase adjustment determined from the data samples.

In an example, block 506 includes a blocks 507 and 508. At block 507, the CDR 112 determines the net phase adjustment based on the data samples and edge samples derived from the data samples. At block 508, the CDR 112 selects gain parameters for the dynamic gain based on values of the net phase adjustment.

Figure 6:
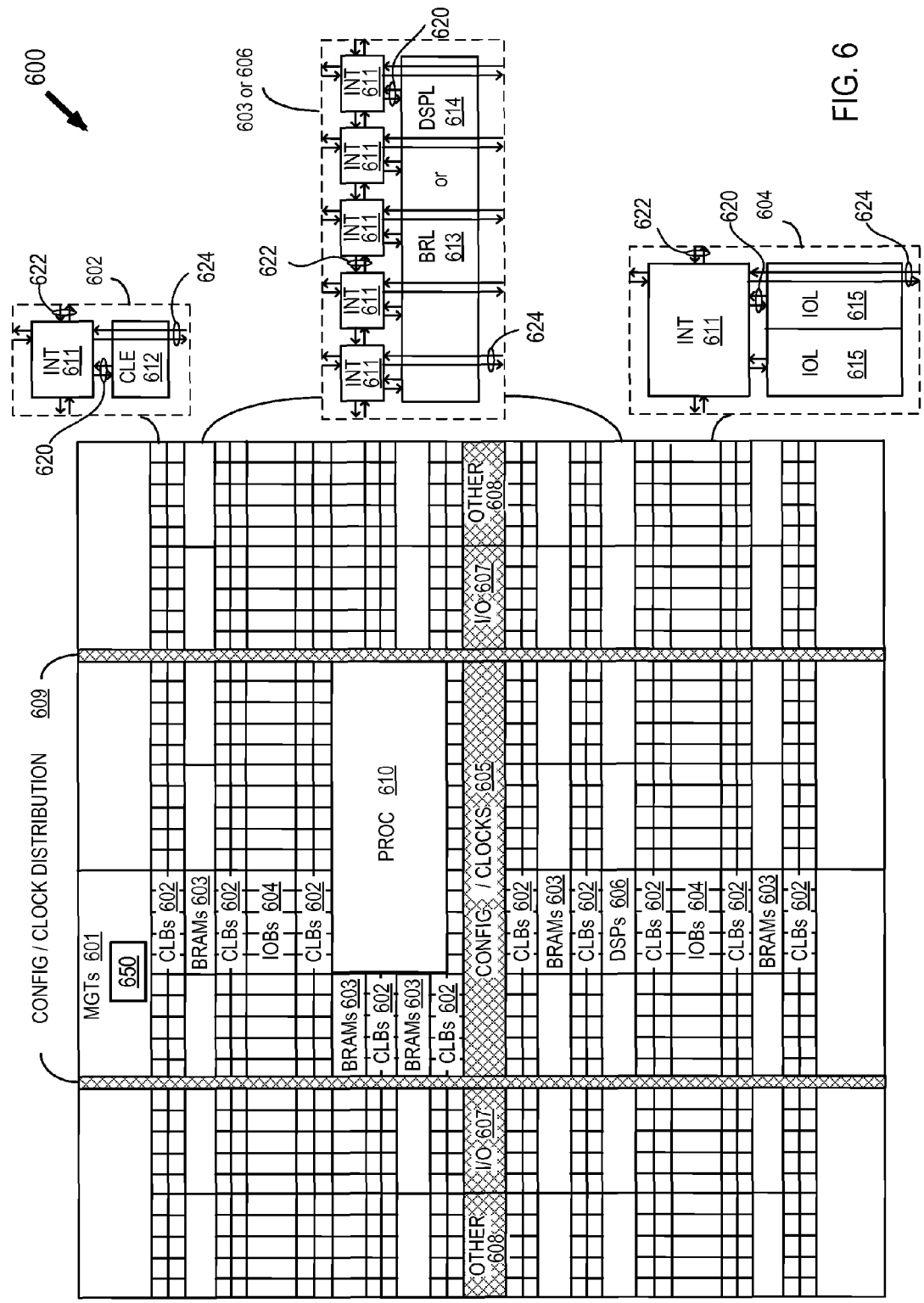
FIG. 6 illustrates an field programmable gate array (FPGA) architecture in which a CDR as described herein can be utilized.

The CDR systems described herein can be used in serial receivers or transceivers disposed in an IC, such as an FPGA. FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output blocks ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610.

In some FPGAs, each programmable tile can include at least one programmable interconnect element ("INT") 611 having connections to input and output terminals 620 of a programmable logic element within the same tile, as shown by examples included at the top of FIG. 6. Each programmable interconnect element 611 can also include connections to interconnect segments 622 of adjacent programmable interconnect element(s) in the same tile or other tile(s). Each programmable interconnect element 611 can also include connections to interconnect segments 624 of general routing resources between logic blocks (not shown). The general routing resources can include routing channels between logic blocks (not shown) comprising tracks of interconnect segments (e.g., interconnect segments 624) and switch blocks (not shown) for connecting interconnect segments. The interconnect segments of the general routing resources (e.g., interconnect segments 624) can span one or more logic blocks. The programmable interconnect elements 611 taken together with the general routing resources implement a programmable interconnect structure ("programmable interconnect") for the illustrated FPGA.

In an example implementation, a CLB 602 can include a configurable logic element ("CLE") 612 that can be programmed to implement user logic plus a single programmable interconnect element ("INT") 611. A BRAM 603 can include a BRAM logic element ("BRL") 613 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 606 can include a DSP logic element ("DSPL") 614 in addition to an appropriate number of programmable interconnect elements. An 10B 604 can include, for example, two instances of an input/output logic element ("IOL") 615 in addition to one instance of the programmable interconnect element 611. As will be clear to those of skill in the art, the actual I/O pads connected, for example, to the I/O logic element 615 typically are not confined to the area of the input/output logic element 615.

In the pictured example, a horizontal area near the center of the die (shown in FIG. 6) is used for configuration, clock, and other control logic. Vertical columns 609 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 610 spans several columns of CLBs and BRAMs. The processor block 610 can various components ranging from a single microprocessor to a complete programmable processing system of microprocessor(s), memory controllers, peripherals, and the like.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, one or more of the MGTs 601 can include a CDR system 650 for clock recovery. The CDR system 650 can be similar to the CDR system 300 shown in FIG. 3, or the CDR system 400 shown in FIG. 4.

While the foregoing is directed to specific examples, other and further examples may be devised without departing from the basic scope thereof, and the scope thereof is determined by the claims that follow.

What is claimed is:

1. An apparatus for clock data recovery (CDR), comprising:
   at least one data register;
   at least one edge register having an input coupled to an output of the at least one data register;
   a phase detector having inputs coupled to the output of the at least one data register and an output of the at least one edge register;
   a frequency accumulator coupled to an output of the phase detector;

a dynamic gain circuit coupled to the output of the phase detector; and a phase accumulator and code generator circuit configured to generate codes to control a phase interpolator based on an output of the dynamic gain circuit and an output of the frequency accumulator.

2. The apparatus of claim 1, further comprising:

an adder having inputs coupled to the output of the frequency accumulator, the output of the dynamic gain circuit, and an output of the phase accumulator and code generator circuit, the adder including an output coupled to an input of the phase accumulator and code generator circuit;

the phase accumulator and code generator circuit configured to generate the codes based on the output of the adder.

3. The apparatus of claim 1, wherein the phase detector circuit generates a net phase adjustment in response to data samples output by the at least one data register and edge samples output by the at least one edge register.

4. The apparatus of claim 3, wherein the dynamic gain circuit is configured to apply a dynamic gain to the net phase adjustment output by the phase detector.

5. The apparatus of claim 4, wherein the dynamic gain circuit decreases the dynamic gain as the net phase adjustment decreases.

6. The apparatus of claim 1, wherein the dynamic gain circuit comprises:

a gain circuit having an input coupled to the output of the phase detector circuit; and multiplexing logic having inputs receiving gain parameters and an output coupled to another input of the gain circuit;

wherein the gain circuit applies a gain to the output of the phase detector circuit based on the output of the multiplexing logic.

7. The apparatus of claim 5, wherein the multiplexing logic comprises:

a first multiplexer; and a second multiplexer having an input coupled to an output of the first multiplexer, the second multiplexer including an output coupled to the other input of the gain circuit.

8. A receiver, comprising:

a front end operable to receive from a transmitted signal from a channel;

a decision circuit, coupled to an output of the front end, operable to generate data samples according to a sampling clock;

a phase interpolator operable to provide the sampling clock; and a clock data recovery (CDR) circuit operable to control the phase interpolator to adjust phase of the sampling clock, the CDR comprising:

at least one data register;

at least one edge register having an input coupled to an output of the at least one data register;

a phase detector having inputs coupled to the output of the at least one data register and an output of the at least one edge register;

a frequency accumulator coupled to an output of the phase detector;

a dynamic gain circuit coupled to the output of the phase detector; and a phase accumulator and code generator circuit configured to generate codes to control the phase interpolator based on an output of the dynamic gain circuit and an output of the frequency accumulator.

9. The receiver of claim 8, wherein the CDR circuit further comprises:

an adder having inputs coupled to the output of the frequency accumulator, the output of the dynamic gain circuit, and an output of the phase accumulator and code generator circuit, the adder including an output coupled to an input of the phase accumulator and code generator circuit;

the phase accumulator and code generator circuit configured to generate the codes based on the output of the adder.

10. The receiver of claim 8, wherein the phase detector circuit generates the net phase adjustment in response to data samples output by the at least one data register and edge samples output by the at least one edge register.

11. The receiver of claim 10, wherein the dynamic gain circuit is configured to apply the dynamic gain to the net phase adjustment output by the phase detector.

12. The receiver of claim 11, wherein the dynamic gain circuit decreases the dynamic gain as the net phase adjustment decreases.

13. The receiver of claim 8, wherein the dynamic gain circuit comprises:

a gain circuit having an input coupled to the output of the phase detector circuit; and multiplexing logic having inputs receiving gain parameters and an output coupled to another input of the gain circuit;

wherein the gain circuit applies a gain to the output of the phase detector circuit based on the output of the multiplexing logic.

14. The receiver of claim 13, wherein the multiplexing logic comprises:

a first multiplexer; and a second multiplexer having an input coupled to an output of the first multiplexer, the second multiplexer including an output coupled to the other input of the gain circuit.

15. A method of clock data recovery (CDR) for a receiver, comprising:

generating data samples derived from a received signal using a decision circuit;

generating a sampling clock for the decision circuit using a phase interpolator;

adjusting a phase of the sampling clock by applying a dynamic gain to a net phase adjustment determined by a CDR circuit, selecting a first gain parameter for the dynamic gain based on a first value of the net phase adjustment, and selecting a second gain parameter for the dynamic gain based on a second value of the net phase adjustment.

16. The method of claim 15, wherein the step of adjusting comprises:

decreasing dynamic gain as the net phase adjustment decreases.

17. The method of claim 15, wherein the step of adjusting comprises:

determining the net phase adjustment in response to the data samples and edge samples derived from the data samples.

18. The method of claim 15, wherein the first value of the net phase adjustment is greater than the second value of the net phase adjustment, and wherein the first gain parameter is greater than the second gain parameter.

* * * * *